US008750831B2

(12) United States Patent
Ren et al.

(10) Patent No.: US 8,750,831 B2
(45) Date of Patent: Jun. 10, 2014

(54) METHOD AND APPARATUS FOR REALIZING UNLOCKING FOR TERMINAL DEVICE

(75) Inventors: Jing Ren, Shenzhen (CN); Xiaolei Li, Shenzhen (CN)

(73) Assignee: ZTE Corporation (CN)

( * ) Notice: Subject to any disclaimer, the term of this patent is extended or adjusted under 35 U.S.C. 154(b) by 46 days.

(21) Appl. No.: 13/393,317

(22) PCT Filed: Jun. 9, 2010

(86) PCT No.: PCT/CN2010/073697
§ 371 (c)(1),
(2), (4) Date: Feb. 29, 2012

(87) PCT Pub. No.: WO2011/026361
PCT Pub. Date: Mar. 10, 2011

(65) Prior Publication Data
US 2012/0157055 A1    Jun. 21, 2012

(30) Foreign Application Priority Data
Sep. 4, 2009    (CN) .......................... 2009 1 0171462

(51) Int. Cl.
*H04M 1/68*    (2006.01)
(52) U.S. Cl.
USPC ........................................................ 455/411
(58) Field of Classification Search
USPC ........... 455/410, 411, 558, 422.1, 466, 404.1, 455/432.1; 379/189; 712/1–36; 380/247; 726/28

See application file for complete search history.

(56) References Cited

U.S. PATENT DOCUMENTS

| 7,689,204 | B2  |   | 3/2010  | Dupuis et al.          |
|-----------|-----|---|---------|------------------------|
| 2008/0005577 | A1 | * | 1/2008 | Rager et al. .................... 713/183 |
| 2008/0113687 | A1 |   | 5/2008 | Prendergast et al.     |
| 2009/0312055 | A1 | * | 12/2009 | Liu .............................. 455/558 |
| 2010/0015949 | A1 | * | 1/2010 | Bradley ........................ 455/410 |
| 2010/0031371 | A1 | * | 2/2010 | Adams et al. ................... 726/27 |

FOREIGN PATENT DOCUMENTS

| CN | 1533207 A     | 9/2004 |
| CN | 1606326 A     | 4/2005 |
| CN | 101651942 A   | 2/2010 |
| WO | 9526115 A1    | 9/1995 |

* cited by examiner

*Primary Examiner* — Kiet Doan
(74) *Attorney, Agent, or Firm* — Brooks Kushman P.C.

(57) ABSTRACT

The present invention discloses a method and apparatus for realizing unlocking a terminal device, and the method comprises: after the terminal device is powered on, querying and recording a network locking state of the terminal device through a UI; and if the UI checks that the terminal device is inserted with a SIM card and the network locking state of the terminal device is "network locked", asking a user to unlock the terminal device through the UI.

10 Claims, 2 Drawing Sheets

METHOD AND APPARATUS FOR REALIZING UNLOCKING FOR TERMINAL DEVICE

CROSS-REFERENCE TO RELATED APPLICATIONS

This application is a U.S. national phase of PCT Application No. PCT/CN2010/073697 filed Jun. 9, 2010 which claims priority to Chinese Application No. 200910171462.9 filed Sep. 4, 2009, the disclosures of which are incorporated in their entirety by reference herein.

TECHNICAL FIELD

The present invention mainly relates to a method and apparatus for unlocking a network device in a wireless terminal in the field of wireless communication.

BACKGROUND OF THE RELATED ART

With the coming of the era of third generation mobile communication technology (3G), the extension of the terminal market is accelerated in the worldwide. To attract user groups, operators around the world unremittingly pursue the individual service of their own products and software and try to improve the user experience, so that the good user experience is the ultimate goal of the competition. From the user's perspective, on the one hand, the operator considers to restrict the local users not belonging to that operator from freely using their products and software to avoid a series of problems due to the improper operations by such users; on the other hand, the operator also considers that the local users might be developed to visited users, and its own products is needed to be used cooperatively with the visited operator's products.

To prohibit other operators from using the products and software, the traditional terminal product will perform network locking to the terminal device according to the operator's mobile country code (MCC) and mobile network code (MNC), while providing the unlocking service by the terminal management software, in which that unlocking service must be implemented with a Subscriber Identity Module (SIM) card, that is, the terminal device, the terminal management software and the SIM card are three indispensable requirements. Obviously, the traditional unlocking solution cannot meet the requirement that the local user are able to use the product in a visited place, this is because the user's original SIM card does not work normally or the cost is too high in the visited place, and the user in the visited place cannot conveniently resort to the product operator to unlock the device.

Therefore, the traditional solution for unlocking the terminal device must be improved to conveniently meet the requirement that the local user be able to use the products in the visited places, thus attracting user groups and improve the user experience.

CONTENT OF THE INVENTION

The technical problem to be solved by the present invention is to provide a method and apparatus for realizing unlocking a terminal device so as to conveniently meet the requirement that a local user is able to use the products in a visited place.

In order to solve the aforementioned technical problem, the present invention provides a method for realizing unlocking a terminal device, comprising:

after the terminal device is powered on, querying and recording a network locking state of the terminal device through a user interface (UI), if the UI checks that the terminal device is not inserted with a Subscriber Identity Module (SIM) card and the network locking state of the terminal device is "network locked", asking a user to unlock the terminal device through the UI.

The step for querying and recording the network locking state of the terminal device through the UI comprises: the UI querying the network locking state of the terminal device through a newly added instruction during initialization, and acquiring a state value of the network locking state through a response of the terminal device, wherein, the acquired state value comprises any one of "network not locked", "network locked" and "unlocked".

The method also comprises: at the same time querying and recording the network locking state of the terminal device through the UI, querying and recording an International Mobile Equipment Identity (IMEI) of the terminal device;

wherein, the step of asking the user to unlock the terminal device through the UI comprises:

enabling an unlocking window through the UI to ask the user of the terminal device to input an unlocking code; and verifying the unlocking code input by the user according to an unlocking code carried by the IMEI, after passing the verification, prompting that the unlocking is successful, and changing the state value to the "unlocked"; and if the verification is not passed, prompting that the unlocking is failed.

The method also comprises:

if the unlocking of the terminal device is successful, then after the terminal device is inserted with the SIM card by a prompt, allowing the terminal device to be used normally;

or, if the unlocking of the terminal device is failed, then prompting the user to re-input the unlocking code through the UI, and re-verifying the re-input unlocking code, until the unlocking is successful.

The method also comprises:

if the UI checks that the terminal device is inserted with the SIM card and the network locking state of the terminal device is the "network locked", using a conventional unlocking flow to unlock the terminal device, allowing the terminal device to be used normally after unlocking is successful, and changing a state value to "unlocked" at the same time.

The method also comprises:

if the UI checks that the terminal device is not inserted with the SIM card and the network locking state of the terminal device is the "network not locked" or the "unlocked", then after the terminal device is inserted with the SIM card by a prompt, allowing the terminal device to be normally used.

In order to solve the above technical problem, the present invention provides an apparatus for realizing unlocking a terminal device, and the apparatus comprises a network locking state query module, a Subscriber Identity Module (SIM) card query module and an unlocking module that are connected in turn, wherein:

the network locking state query module is configured to: query and record a network locking state of the terminal device when the terminal device is powered on, if the network locking state is "network locked", transfer a SIM card state query instruction to the SIM card query module; send a prompt of inserting a SIM card according to an unlocking successful indication transferred by the unlocking module and a no SIM card indication returned by the SIM card query module;

the SIM card query module is configured to: after receiving the SIM card state query instruction, when querying that the terminal device is not inserted with the SIM card, return the no SIM card indication to the network locking state query module, and meanwhile, transfer a no SIM card unlocking instruction to the unlocking module;

the unlocking module is configured to: provide an unlocking window to the user according to the no SIM card unlocking instruction, and after unlocking is successful, transfer the unlocking successful indication to the network locking state query module.

The network locking state query module is configured to query and record the network locking state of the terminal device when the terminal device is powered on through the following way of: querying the network locking state of the terminal device through a newly added instruction during initialization, and acquiring a state value of the network locking state through a response of the terminal device, wherein, the acquired state value comprises any one of "network not locked", "network locked" and "unlocked".

An unlocking preparing module is connected between the network locking state query module and the unlocking module;

the network locking state query module is further configured to: transfer an unlocking preparing instruction to the unlocking preparing module while transferring the SIM card state query instruction;

the unlocking preparing module is configured to: query and record an International Mobile Equipment Identity (IMEI) of the terminal device according to the unlocking preparing instruction, and transfer a query result to the unlocking module;

the unlocking module is configured to: verify an unlock code input by a user in an unlocking window according to an unlocking code carried by the received IMEI, after the verification is passed, change the network locking state to "unlocked", and transfer the network locking state to the network locking state query module by carrying the network locking state in the unlocking successful indication.

The SIM card query module is further configured to: when querying that the terminal device has been inserted with the SIM card, return a SIM card ready indication to the network locking state query module, and transfer a conventional unlocking instruction to the unlocking module at the same time;

the unlocking module is further configured to: use a conventional unlocking mode to unlock the terminal device according to the conventional unlocking instruction, after the unlocking is successful, change the network locking state to "unlocked", and transfer the network locking state to the network locking state query module by carrying the network locking state in the unlocking successful indication;

the network locking state query module is further configured to: send an instruction of the device being used normally according to the unlocking successful indication and the SIM card ready indication.

The present invention breaks the traditional unlocking mode, so that the query of the network locking state of the terminal device and the unlocking is not necessary to rely on the ready of the SIM card, and meanwhile, from the user's perspective, is compatible with the conventional unlocking flow in the case that the SIM card is inserted. The entire solution is very flexible and very convenient to be used by the users, thus being able to create a good user experience.

PREFERRED EMBODIMENTS OF THE PRESENT INVENTION

The inventive idea of a method and apparatus for realizing unlocking a terminal device provided by the present invention is, installing a user interface (UI) in the terminal, so that, no matter whether the user terminal is inserted a SIM card, unlocking and using the terminal device can be realized by the UI, and the traditional unlocking operation mode is maintained, which provides the support of the local user using the terminal device in the visited place and is compatible with the function of the local user using the terminal device locally.

In the following, the technical solution of the present invention will be described in detail in combination with the accompanying drawings and preferred embodiments. The following embodiments are only used to illustrate and explain the present invention and are not intended to restrict the technical solution of the present invention.

The method and apparatus for realizing unlocking the terminal device of the present invention need the support of the following three entities:

one is a Wireless Terminal Device (WTD), and the typical WTD is a wireless data card, a wireless USB MODEM, and so on, which hereinafter are all called as the terminal device;

the second is a terminal management software, the typical terminal management software is a man-machine interactive interface, which is a user interface application program, installed on a desktop or notebook PC, it is used cooperatively with the terminal device, and hereinafter they are all referred to as the UI;

the third is a variety of card resources, such as a UIM card (i.e., CDMA standard mobile phone card), a SIM card (i.e., 2G mobile phone card) and a USIM card (namely, 3G mobile phone card), and so on, and hereinafter all of them are referred to as the SIM card.

Before implementing the method for realizing unlocking the terminal device of the present invention, it needs to perform some premised preparation work, that are:

(1) requiring the support of a related serial communication protocol, such as an Attention (AT) protocol or a Diagnostic Responder protocol (DIAG) protocol;

(2) taking the AT protocol for example, extending one AT command to both the terminal device and the terminal management software, that is, "AT+ZNCK=?", which is used to query the network locking state of the current terminal device, wherein: the state value "0" denotes the device with network not locked, the state value "1" denotes the device with network locked, and the state value "2" denotes the device with unlocked;

(3) designing a UI window for interacting with users on the terminal management software interface, to provide the function of unlocking the terminal device under the state of no SIM card; and (4) programming a initialization program of the terminal device, and regarding to the unlocking related link, realizing performing the unlocking operation to the terminal device by judging the network locking state and the SIM card state of the terminal device.

Figure 1:
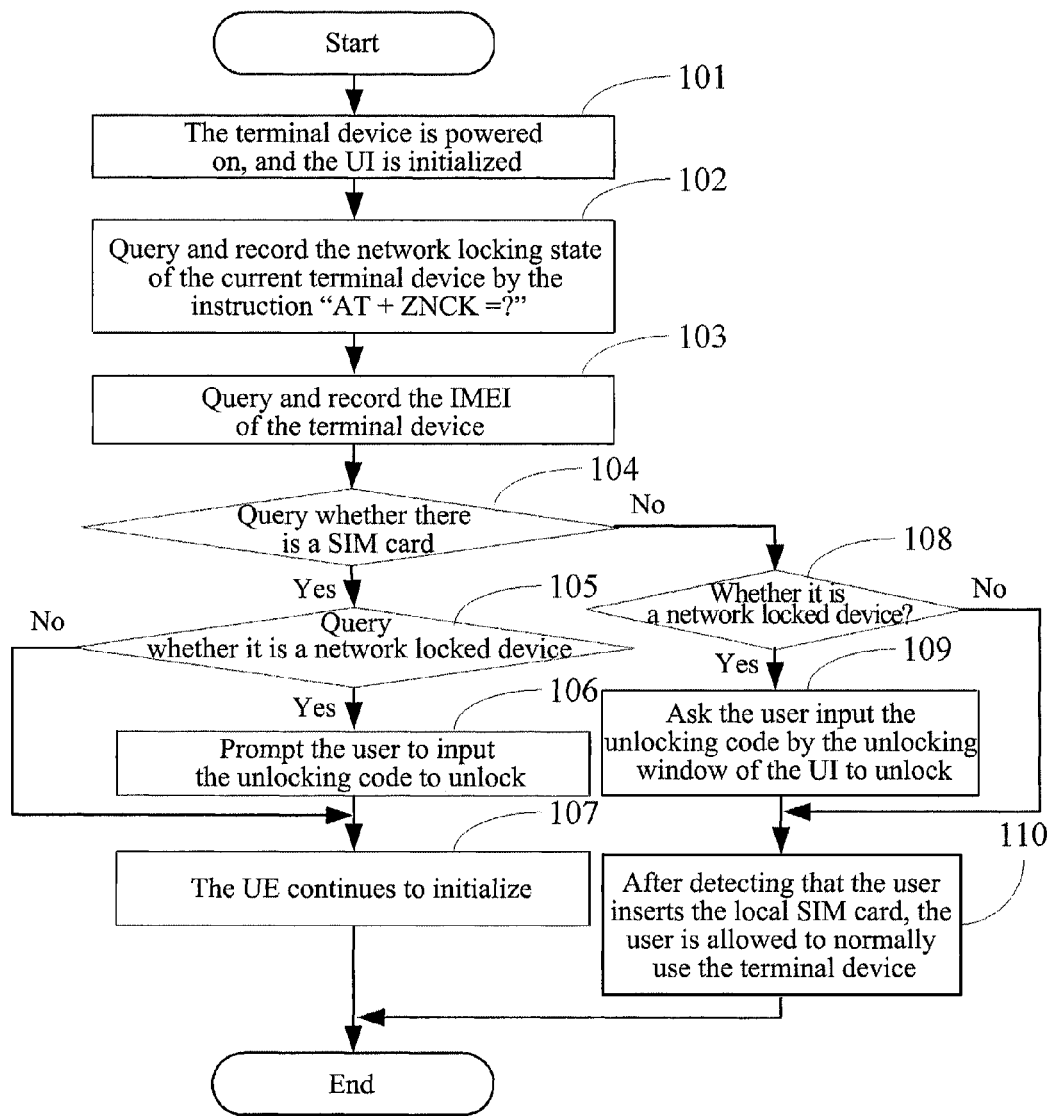
FIG. 1 is a flow chart of a method embodiment for realizing unlocking a terminal device through a UI in accordance with the present invention.

On the basis of the aforementioned premised preparation work, the method for realizing unlocking the terminal device of the present invention is reflected through the flow chart of the embodiment shown in FIG. 1, and the flow comprises the following steps.

In step 101, the terminal device is powered on, and the UI installed in the terminal is initialized.

In step 102, the UI queries and records the network locking state of the current terminal device by the newly added instruction "AT+ZNCK=?".

After the UI sends that newly added instruction to the terminal device, the UI will acquire any one of state values "0", "1" and "2", which are respectively used to denote the device with network not locked, the device with network locked and the device with unlocked, by a response of the terminal device.

In step 103, the UI queries and records an International Mobile Equipment Identity (IMEI) of the terminal device for unlocking.

Every terminal device has a unique IMEI, and when the terminal device is sold by the operator, an unlocking code might be carried along with the IMEI of the terminal device; the unlocking code can be used to verify an unlocking code input by the user during the unlocking; and if the unlocking code is not carried during selling the terminal device, then the user needs to resort to the operator to execute the unlocking process.

In step 104, the UI queries whether the terminal device has a SIM card, if yes, step 105 is performed, otherwise, step 108 is performed;

In steps 105-107, the conventional unlocking flow is enabled to unlock the terminal device; that is, the network locking state of the terminal device is queried, and if the device is a device with network locked, the UI prompts the user to input the unlocking code to unlock, and verifies the unlocking code input by the user according to the unlocking code carried by the IMEI of the terminal device, the unlocking is successful after the verification is passed, and then the state value is changed to the "unlocked"; the UI continues to be initialized; and if the device is a device with network not locked, the UI does not perform the unlocking operation and continues to perform the initialization; the flow ends.

Afterwards, the UI allows the user to normally use the terminal device for Internet accessing.

In steps 108~110, the UI compares the query result returned through the instruction "AT+ZNCK=?", if the result is the device with network locked, the UI prompts the user to input the unlocking code at the enabled unlocking window, and verifies the unlocking code input by the user according to the unlocking code carried by the IMEI of the terminal device, the unlocking is successful after the verification is passed, and then the state value is changed to the "unlocked"; the UI initialization process is terminated, and the user is allowed to normally use the terminal device after the user inserts the local SIM card; if the device is a device with network not locked, the UI prompts the user that the current device has no SIM card, and the user is allowed to normally use the terminal device after the user inserts the local SIM card; until now, the UI initialization is completed, and the flow ends.

By clicking the unlocking button provided on the UI, the user performs the unlocking operation in a pop-up unlocking interface.

The solution for realizing unlocking the terminal device proposed by the present invention can be applied to any terminal device and the matched UI.

Figure 2:
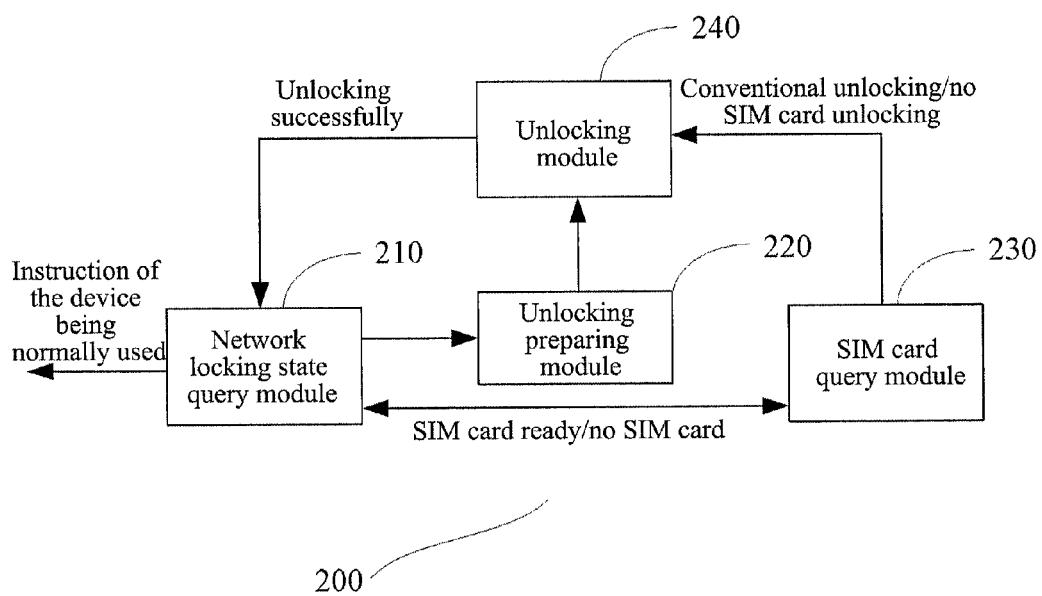
FIG. 2 is a structure diagram of an apparatus embodiment for realizing unlocking a terminal device in accordance with the present invention.

Regarding to the aforementioned method, the present invention correspondingly provides an apparatus embodiment for realizing unlocking the terminal device, which is shown in FIG. 2. The device 200 comprises A network locking state query module 210, a SIM card query module 230 and an unlocking module 240 that are connected in turn, and the device 200 also comprises an unlocking preparing module 220.

The network locking state query module 210 is configured to query and record the network locking state of the terminal device, if the queried state is the network locked, transfer a SIM card state query instruction to the SIM card query module 230, and meanwhile transfer a unlocking preparing instruction to the unlocking preparing module 220; prompt the terminal device to insert the SIM card according to an unlocking successful indication transferred by the unlocking module 240 and a no SIM card indication returned by the SIM card query module 230; or, send an instruction of the device being used normally according to the unlocking successful indication and a SIM card ready indication.

The network locking state query module 210 queries and records the network locking state of the current terminal device by the newly added instruction "AT+ZNCK=?". After sending the newly added instruction to the terminal device, the network locking state query module 210 acquires any one of the state values "0", "1" and "2", which are respectively used to denote the states of network not locked, the network locked and unlocked, by the response of the terminal device.

The network locking state query module 210 also re-transfers a SIM card state query instruction to the SIM card query module 230 while prompting the terminal device to insert the device code, until the SIM card query module 230 returns the SIM card ready indication.

The unlocking preparing module 220 is respectively connected with the network locking state query module 210 and the unlocking module 240, and is used to query and recode the IMEI of the terminal device after receiving the unlocking preparing instruction, and transfer the query result to the unlocking module 240.

The SIM card query module 230 is used to: after receiving the SIM card state query instruction, query the SIM card state of the terminal, if the query result is that no SIM card is inserted, transfer a no SIM card unlocking instruction to the unlocking module 240, and return a no SIM card indication to the network locking state query module 210 at the same time; and if the query result is that the SIM card is ready, transfer a conventional unlocking instruction to the unlocking module 240, and return a SIM card ready indication to the network locking state query module 210 at the same time.

The unlocking module 240 is used to provide an unlocking window to the user according to the no SIM card unlocking instruction transferred by the SIM card query module 230, update the network locking state to the unlocked after the unlocking is successful, and carry the network locking state in the unlocking successful indication and transfer to the network locking state query module 210; or, according to the conventional unlocking instruction sent by the SIM card query module 230, perform the conventional unlocking operation to the terminal device, and after the unlocking is successful, update the network locking state to the unlocked, and carry the network locking state in the unlocking successful indication and transfer to the network locking state query module 210.

The unlocking module 240 provides a window for the user inputting the unlocking code, verifies the unlocking code input by the user according to the unlocking code carried in the IMEI transferred by the unlocking preparing module 220, after the verification is passed, sends an unlocking successful indication, and if the verification is not passed, prompts the user to re-input the unlocking code and re-verifies the re-inputted unlocking code, until the verification is passed.

The solution for unlocking the terminal device with no SIM card provided by the present invention requires the UI and the terminal device to extend the "AT+ZNCK=?" instruction at the same time, therefore, in order to make the UI extended with that instruction have a good compatibility and be able to work cooperatively with the common terminal device, the present invention maintains the traditional unlocking flow.

The specific examples of the present invention have been used to fully illustrate the content of the present invention. For those skilled in the art, the present invention can have a variety of modifications or variations, and within the spirit and essence of the present invention, any modification, equivalent and improvement should be comprised within the scope of the present invention.

INDUSTRIAL APPLICABILITY

The present invention breaks the traditional unlocking mode, so that the query of the network locking state of the terminal device and the unlocking is not necessary to rely on the ready of the SIM card, and meanwhile, from the user's perspective, is compatible with the conventional unlocking flow in the case that the SIM card is inserted. The entire solution is very flexible and very convenient to be used by the users, thus being able to create a good user experience.

What is claimed is:

1. A method for realizing unlocking a terminal device, comprising:
   after the terminal device is powered on, a user interface (UI) querying and recording a network locking state of the terminal device, the UI querying and recording an International Mobile Equipment Identity (IMEI) of the terminal device, and the UI detecting whether the terminal device is inserted with a Subscriber Identity Module (SIM) card;
   when the UI detects that the terminal device is not inserted with the SIM card and the network locking state of the terminal device is "network locked", asking a user to unlock the terminal device via the UI;
   wherein the step of asking the user to unlock the terminal device via the UI comprises:
   enabling an unlocking window through the UI to ask the user of the terminal device to input an unlocking code; and
   verifying the unlocking code input by the user according to an unlocking code carried by the IMEI, when the verification is passed, prompting that the unlocking is successful, and changing the network locking state to "unlocked"; and when the verification is not passed, prompting that the unlocking is failed.

2. The method according to claim 1 wherein the step of the UI querying and recording the network locking state of the terminal device comprises: the UI querying the network locking state of the terminal device through a newly added instruction during initialization, and acquiring a state value of the network locking state through a response of the terminal device, wherein, the acquired state value comprises any one of "network not locked", "network locked" and "unlocked".

3. The method according to claim 2 further comprising:
   when the UI detects that the terminal device is not inserted with the SIM card and the network locking state of the terminal device is the "network not locked" or the "unlocked", then after the terminal device is inserted with the SIM card in response to a prompt, allowing the terminal device to be normally used.

4. The method according to claim 1, further comprising:
   when the unlocking of the terminal device is successful, then after the terminal device is inserted with the SIM card in response to a prompt, allowing the terminal device to be used normally; or
   when the unlocking of the terminal device is failed, then prompting the user to re-input the unlocking code through the UI, and re-verifying the re-input unlocking code, until the unlocking is successful.

5. The method according to claim 1, further comprising:
   when the UI detects that the terminal device is inserted with the SIM card and the network locking state of the terminal device is the "network locked", using a conventional unlocking flow to unlock the terminal device, allowing the terminal device to be used normally after the unlocking is successful, and changing the network locking state to "unlocked" at the same time.

6. The method according to claim 2 further comprising:
   when the unlocking of the terminal device is successful, then after the terminal device is inserted with the SIM card in response to a prompt, allowing the terminal device to be used normally; or
   when the unlocking of the terminal device is failed, then prompting the user to re-input the unlocking code through the UI, and re-verifying the re-input unlocking code, until the unlocking is successful.

7. An apparatus for realizing unlocking a terminal device, comprising a network locking state query module, a Subscriber Identity Module (SIM) card query module and an unlocking module that are connected in sequence, wherein:
   the network locking state query module is configured to: query and record a network locking state of the terminal device when the terminal device is powered on, when the network locking state is "network locked", send a SIM card state query instruction to the SIM card query module; and send a prompt of inserting a SIM card according to an unlocking successful indication sent by the unlocking module and a no SIM card indication returned by the SIM card query module;
   the SIM card query module is configured to: after receiving the SIM card state query instruction, when detecting that the terminal device is not inserted with the SIM card, return the no SIM card indication to the network locking state query module, and meanwhile, send a no SIM card unlocking instruction to the unlocking module;
   the unlocking module is configured to: provide an unlocking window to a user according to the no SIM card unlocking instruction, and after the unlocking is successful, send the unlocking successful indication to the network locking state query module;
   wherein the apparatus further comprises an unlocking preparing module which is connected between the network locking state query module and the unlocking module;
   the network locking state query module is further configured to: send an unlocking preparing instruction to the unlocking preparing module while sending the SIM card state query instruction;
   the unlocking preparing module is configured to: query and record an International Mobile Equipment Identity (IMEI) of the terminal device according to the unlocking preparing instruction, and send a query result to the unlocking module;
   the unlocking module is further configured to: verify an unlocking code input by the user in the unlocking window according to an unlocking code carried by the received IMEI, after the verification is passed, change the network locking state to "unlocked", and send the network locking state to the network locking state query module by carrying the network locking state in the unlocking successful indication.

8. The apparatus according to claim 7, wherein,
the network locking state query module is configured to query and record the network locking state of the terminal device when the terminal device is powered on by querying the network locking state of the terminal device through a newly added instruction during initialization, and acquiring a state value of the network locking state through a response of the terminal device, and wherein the acquired state value comprises any one of "network not locked", "network locked" and "unlocked".

9. The apparatus according to claim 8 wherein
the SIM card query module is further configured to implement the following steps when detecting that the terminal device has been inserted with the SIM card: return a SIM card ready indication to the network locking state query module, and send a conventional unlocking instruction to the unlocking module at the same time;
the unlocking module is further configured to use a conventional unlocking mode to unlock the terminal device according to the conventional unlocking instruction, after the unlocking is successful, change the network locking state to "unlocked", and send the network locking state to the network locking state query module by carrying the network locking state in the unlocking successful indication;
the network locking state query module is further configured to send an instruction of normally using the terminal device according to the unlocking successful indication and the SIM card ready indication.

10. The apparatus according to claim 7 wherein,
the SIM card query module is further configured to implement the following steps when detecting that the terminal device has been inserted with the SIM card: return a SIM card ready indication to the network locking state query module, and send a conventional unlocking instruction to the unlocking module at the same time;
the unlocking module is further configured to use a conventional unlocking mode to unlock the terminal device according to the conventional unlocking instruction, after the unlocking is successful, change the network locking state to "unlocked", and send the network locking state to the network locking state query module by carrying the network locking state in the unlocking successful indication;
the network locking state query module is further configured to send an instruction of normally using the terminal device according to the unlocking successful indication and the SIM card ready indication.

\* \* \* \* \*